United States Patent [19]
Nickold

[11] 3,987,144
[45] Oct. 19, 1976

[54] METHOD FOR THE REMOVAL OF A MOLD CORE FROM AN INJECTION MOLDED PLASTIC DUCT SECTION

[75] Inventor: Albrecht Nickold, Bad Nauheim, Germany

[73] Assignee: Stapla Stahl - und Plastikverarbeitung GmbH & Co. KG., Rosbach v.d.H., Germany

[22] Filed: July 11, 1974

[21] Appl. No.: 487,734

[30] Foreign Application Priority Data
July 19, 1973 Germany............................ 2336789

[52] U.S. Cl................................. 264/318; 264/336; 425/DIG. 58
[51] Int. Cl.²...................... B29C 1/14; B29C 7/00; B29C 11/00
[58] Field of Search................... 264/318, 334, 336; 425/438, DIG. 58

[56] References Cited
UNITED STATES PATENTS

| | | | |
|---|---|---|---|
| 1,989,724 | 2/1935 | Villanyi............................ | 264/334 X |
| 3,020,594 | 2/1962 | Makowski.......................... | 264/318 |
| 3,325,576 | 6/1967 | Kessler............................. | 264/318 |

FOREIGN PATENTS OR APPLICATIONS

| | | | |
|---|---|---|---|
| 834,140 | 3/1952 | Germany........................... | 264/318 |
| 311,149 | 11/1955 | Switzerland....................... | 264/318 |

*Primary Examiner*—Robert F. White
*Assistant Examiner*—Thomas P. Pavelko
*Attorney, Agent, or Firm*—Toren, McGeady and Stanger

[57] ABSTRACT

In the injection molding of undercut and continuously slotted duct sections from a plastic material where a multi-part mold structure including a core is used, the core of the mold structure is removed, after the injection molding operation, by cooling the plastic material used to a temperature below its softening temperature, releasing the bearing contact of the mold supporting the lateral exterior of the duct section and the exterior base of the duct section, providing a bearing contact with the surface of the duct section upwardly from its base with the bearing contact affording a force restraining the duct section from movement in the direction outwardly from the slotted opening of the duct, and pulling the core outwardly through the continuous slot while the bearing contact with the duct section holds it against displacement due to the pulling action.

2 Claims, 8 Drawing Figures

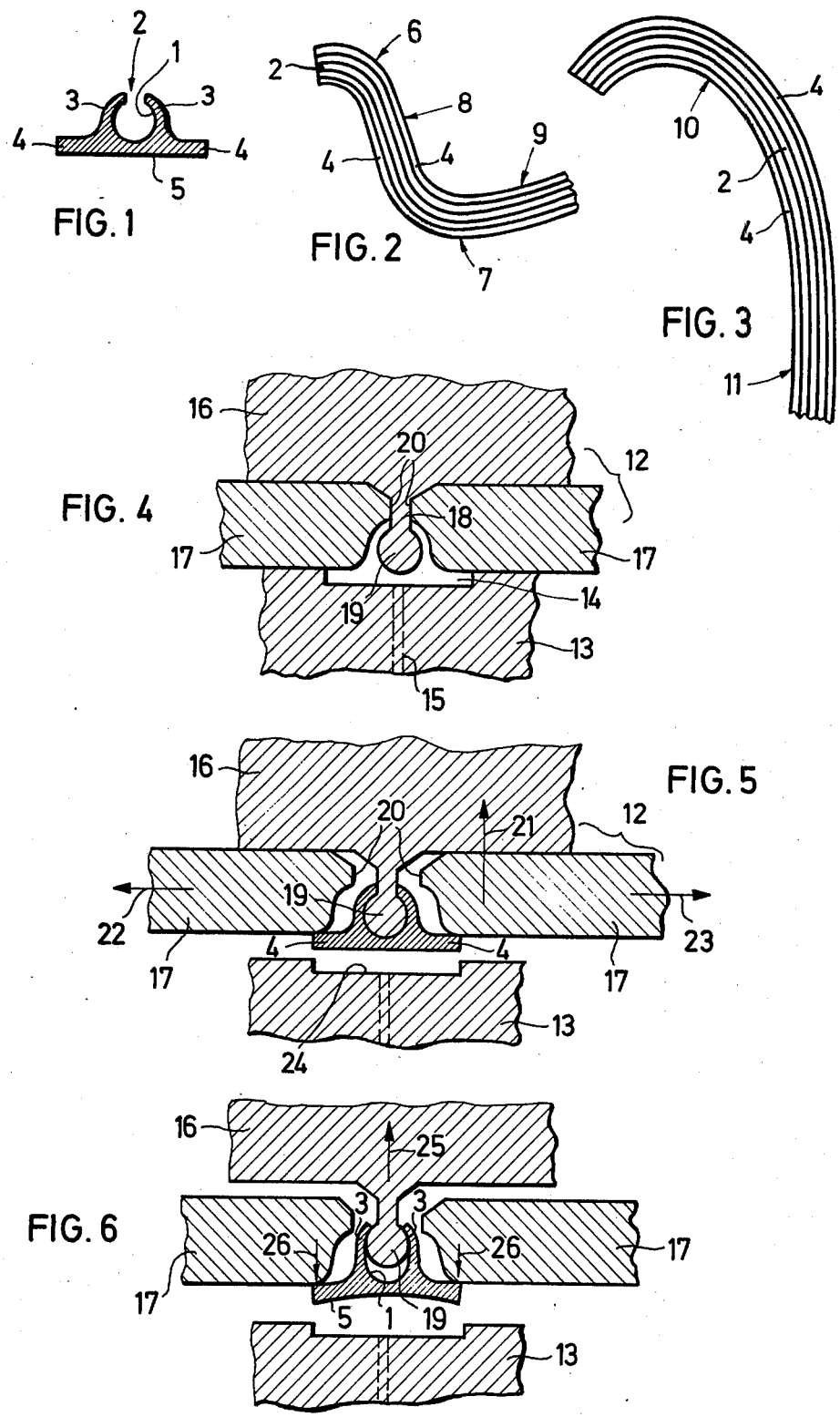

METHOD FOR THE REMOVAL OF A MOLD CORE FROM AN INJECTION MOLDED PLASTIC DUCT SECTION

SUMMARY OF THE INVENTION

The invention relates to the method of removing the core from undercut and continuously slotted plastic duct sections formed by injection molding, and it is also directed to apparatus for carrying out the method.

In removing undercut plastic duct sections from a mold, in the past a one-or multi-part core was removed in the axial direction of the duct, if the molded members could not be produced by extrusion without a core. Such a method can be carried out without any great difficulty if the duct is straight or substantially straight. However, if the duct is curved or composed of straight and curved sections, axial removal is very difficult or impossible, even with multi-part cores.

Because of this problem it has not been possible in the past to produce duct sections usually made of metallic material and having various uses, from plastic by injection molding. As an example, it has not been considered to be possible to injection mold the slotted guide tubes for cable window lifters in motor vehicles, because these greatly undercut tubes are often laid in very narrow bends in the motor vehicle doors.

Further, the use of multi-part cores has the disadvantage in the formation of guide tubes for cable window lifters because the unavoidable and undesired formation of burrs. If the duct sections provide guidance for a displaceable adjusting element, as in guide tubes for cable window lifters, any burrs in the duct hinder the operation and must be removed, if possible.

Therefore, it is the primary object of the present invention to provide a method of and apparatus for removing a one-part core from a continuously slotted duct section even where the duct section is curved.

In accordance with the present invention, after the injection molding operation, the duct section is cooled to a temperature below the softening temperature of the plastic material used and at least that portion of the mold forming the lateral outer contours of the duct section up to the slot are removed. While the duct section is restrained from movement, the core is removed from the duct through its continuous slot by commencing a relative movement between the core and the members restraining the injection molded duct section. The method according to the invention is based on the surprising finding, which is completely different from conventional injection molding methods, that a one-part core can be removed, even from undercut ducts shortly after the injection molding operation by displacing the core through the continuous slot of the duct without any desired permanent deformation resulting in the molded duct section. By the use of the method in accordance with the present invention, it is possible to form guide tubes for cable window lifters from plastic material in an injection molding operation, where, in the past, such guide tubes had to be rolled from metal and subsequently bent into the desired shape.

In a preferred embodiment of the invention, the injection molded section is held stationary during the relative movement between it and the core as the core is pulled outwardly through the continuous slot.

In carrying out the method, it is advantageous if the parts of the mold which form the lateral exterior surfaces of the duct section are used to restrain the duct section from movement during the whole withdrawal operation. In such an arrangement, if laterally extending flanges are provided on the duct section while the lateral mold parts are displaced outwardly from contact with the exterior lateral surface of the duct section they can be retained in restraining relation with the flanges of the duct section. Apparatus for forming the method in accordance with the invention, includes a lower tool part which forms the base portion of the molded section and an upper tool part which forms the interior of the duct section along with its laterally outer and upwardly facing surfaces. The upper and lower tool parts are arranged for movement relative to one another. The upper tool part includes a rounded core joined by a web having a dimension smaller than the diameter of the rounded section and dependently securing the core to an upper support member. The width of the web corresponds to the slot width of the duct section. Further, the upper tool part consists of a pair of oppositely arranged slide parts for forming the lateral outer surfaces of the duct section extending up to its slot. These slide parts each located on an opposite side of the core, are biased by springs in two different directions, one set of springs biases the slide parts outwardly from the core transverse to its longitudinal direction while the other set of springs biases the upper slide parts into contact with the support member and the slide parts can be displaced slightly relative to the support member in the direction of the web extending between the core and the support member. This apparatus permits the injection molding of undercut duct sections with a continuous slot in a single operation during economically short operating periods.

The various features of novelty which characterize the invention are pointed out with particularity in the claims annexed to and forming a part of this disclosure. For a better understanding of the invention, its operating advantages and specific objects attained by its use, reference should be had to the accompanying drawings and description matter in which there is illustrated and described a preferred embodiment of the invention.

BRIEF DESCRIPTION OF THE DRAWING

In the drawing:

FIG. 1 is a transverse cross-sectional view of a duct section with a continuous slot typical of the injection molded member formed in accordance with the invention, such as is used as a guide tube for cable window lifters;

FIG. 2 is a reduced scale partial plan view of the configuration of the duct section shown in FIG. 1 when used as a guide tube;

FIG. 3 is a view similar to FIG. 2 showing a reduced scale partial plan view of another configuration of the duct section;

FIG. 4 is a schematic partial sectional view of the parts of a multi-part injection mold used in molding the duct section illustrated in FIG. 1;

FIGS. 5 to 7 are cross-sectional views similar to that shown in FIG. 4 but indicating various steps in the removal of the multi-part mold from the injection molded duct section.

DETAILED DESCRIPTION OF THE INVENTION

Figure 7:
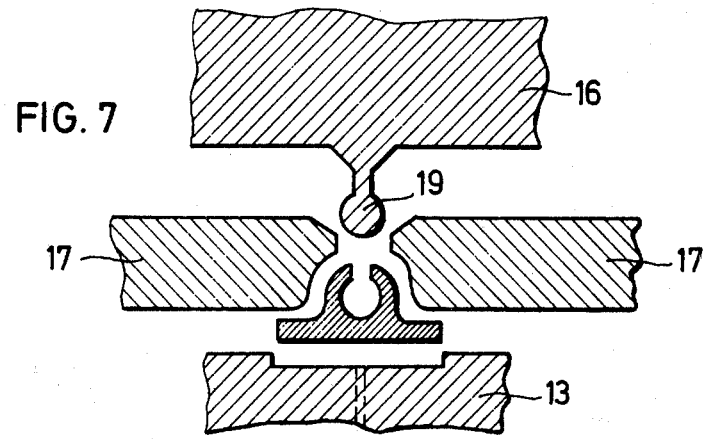

In FIG. 1 a guide tube for a cable window lifter is shown having an undercut guide duct 1 arranged to direct the threaded cable, not shown, for longitudinal displacement to transmit the adjusting movements of a window lifter. A continuous longitudinal slot 2 opens from the duct 1 so that a driver, not shown, rigidly connected with the threaded cable can extend through the slot for connection to the part to be adjusted, for example, a sliding window in a car. The side or lateral walls 3 which define the continuous longitudinal slot between their upper ends, extend downwardly and, without any steps, blend into the lateral flanges 4. The flanges 4 which extend laterally outwardly from the side walls 3 reinforce the guide tube and, at the same time, facilitate the removal of the molded member from the mold as described below. Furthermore, the flanges 4 also serve for securing the guide tube in position at its location of use. The flanges 4 have a base plane 5 defining the lower surface of the guide tube. The continuous transition of the side walls 3 into the flanges 4 is important for the removal of the core because it eliminates harmful notch effects.

As shown in FIG. 2, the configuration of the guide tube is made up of two circular sections 6 and 7 each of a different radius with the straight sections 8 and 9 extending from the curved sections. A guide tube having such a curved configuration does not permit axial removal of the core from the molded section even if a multi-part core is employed. The same problem exists in the arrangement of the guide tube shown in FIG. 3 which is made up of a curved section 10 which is not formed on a single radius with a straight section 11 extending from one of its ends.

In FIG. 4 the injection molding apparatus or tool is shown in the closed, ready-to-use position and is composed substantially of an upper tool part 12 and a lower tool part 13. The upper tool part 12 and lower tool part 13 enclose a chamber 14 which corresponds to the cross-sectional shape of the guide tube illustrated in FIG. 1. Molten plastic is injected into the chamber 14 by means of an extruder, not shown, through a bore 15 indicated by dashed lines within the lower tool part 13. The upper tool part 12 is a multi-part member and includes a core support member 16 and mold slide parts 17. A web 18 is secured integrally to and extends downwardly from the support member 16 with a core 19 of substantially circular cross-section integrally secured to the lower end of the web. The web 18 is centered relative to the core 19 and has a width or thickness less than the diameter of the core and its width substantially corresponds to the width of the longitudinal slot 2. The slide parts 17 have end faces 20 which bear tightly against the surfaces of the web 18 when the mold apparatus is in its closed state. In addition, the slide parts 17 are in planar and closely fitting contact with the surfaces of the core support member 16 and the lower tool part 13 in the closed state of the molding apparatus. Below the end faces 20 of the slide parts 17 the facing surfaces define the laterally outer contours of the guide tube within the chamber extending downwardly to the upper surfaces of the flanges 4. The flanges 4 are formed between the lower surfaces of the slide parts 17 and the oppositely spaced surfaces of the lower tool part 13.

With the molding apparatus in the position shown in FIG. 4, its chamber 14 is filled with a suitable molten plastic, in the case of the production of guide tubes for cable window lifters, for example, with an acetal copolymer. In such an application of the method, as well as for the latter function of the guide tube, the commercially available acetal copolymer "Hostaform C 9020" by Farbwerke Hoechst AG has proven quite suitable.

After a period for coaling the heated injection molding apparatus to a temperature below the softening temperature of the plastic used, which depends on the type of plastic employed, on the injection molding volume relative to the surface of the molded member form and the wall thickness of the member formed, the injection molding apparatus is open, as indicated in FIG. 5 in the direction of the arrow 21. The lower tool part 13 remains stationary and the upper tool part 12 is displaced upwardly providing a separation of the tool parts 12 and 13. At the same time or following the upward displacement indicated by arrow 21, the slide parts 17 are displaced laterally outwardly by identical short amounts while remaining in surface contact with the core support member 16, that is, the two slide parts move in opposite directions as indicated by the arrows 22, 23. The extent of lateral displacement of the slide parts is selected so that, on one hand, the end faces 20 of the slide parts are sufficiently separated to permit the subsequent passage of the core 19 between them and, on the other hand, the slide parts 17 remain in contact with the upper surfaces of the flanges 4 on the molded section. As can be seen in FIG. 5, the two continuous flanges 4 have been removed from the mold depression 24 in the lower mold part.

In the next phase of the removal operation as shown in FIG. 6, there is a separation indicated by the arrow 25 between the core support member 16 and the slide parts 17, because the slide parts are prevented, after having been lifted a certain distance above the lower tool part 13, from continuing in the further upward movement of the core support member 16 as it is displaced in the direction of the arrow 25. Because the slide parts 17 continue to bear on the laterally outer surfaces of the flanges 4, as the core 19 is pulled upwardly out of the guide duct 1 within the molded section, the continued upward movement of the core displaces the side walls 3 of the molded section and, at the same time, causes the base 5 of the molded section to bend or assume a concave configuration. The arrows 26 indicate the reaction forces acting on the flanges 4 as they are restrained by the slide parts 17 during the upward withdrawal of the core 19 out of the molded section through the continuous slot 2.

With the continued upward displacement of the core support member 16 relative to the slide parts 17, the core 19 is displaced further out of the range of the guide duct 1 under continued elastic deformation of the injection molded section in the range of its side walls and the portion connecting the side walls until the maximum diameter of the core 19 moves beyond the edges of the side walls 3 defining the longitudinal slot 2 of the guide tube. With the core displaced upwardly out of the guide duct 1, the elastic restoring forces, which have been built up in the molded section, now act so that the slot edges slide downwardly along the surface of the core 19 below its maximum diameter section. As a result, the molded section rebounds from the core 19 and the slide parts 17, as shown schematically in FIG. 7. The molded section then assumes its original form corresponding to the configuration of the chamber 14. The molded section can be removed from the injection molding apparatus or it may automatically drop out of the apparatus. With the molded section removed, the parts of the apparatus can return into the position shown in FIG. 4 ready for the commencement of the next injection cycle. The return of the parts to the position shown in FIG. 4 takes place in the reverse order to that described above. The removal of the mold section from the mold and the required movements of the various parts of the molding apparatus takes place simultaneously over the entire axial length of the molded section.

Figure 8:
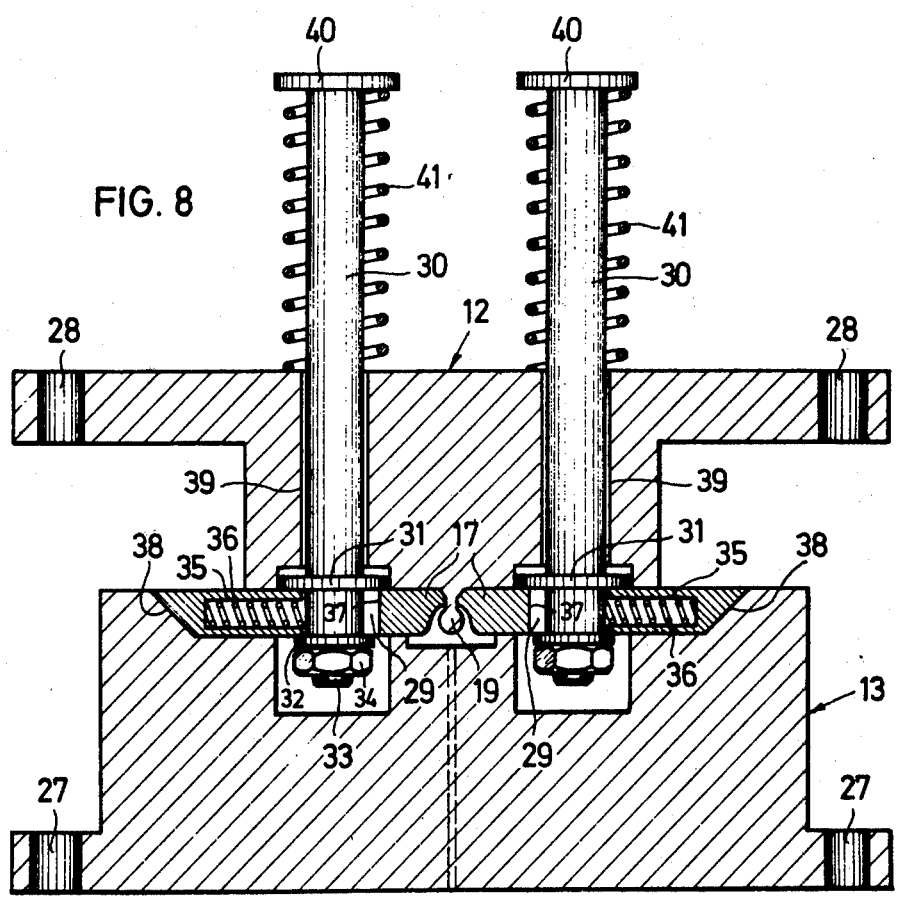
FIG. 8 is a schematic representation in cross-section of an injection molding apparatus in accordance with the present invention.

In FIG. 8 an embodiment of the apparatus used in carrying out the injection molding operation is illustrated. The lower tool part 13 is secured through the bores 27 to the head of an extruder, not shown. Similarly, the upper tool part 12 is secured to a hydraulically displacement support, not shown, of the injection molding apparatus through the bores 28.

The slide parts 17 which form a part of the upper tool part 12, are guided for movement into different directions. To permit movement of the slide parts transversely of the upward direction of movement of the upper tool part 12, the slide parts are each provided with an oblong hole 29 having its oblong dimension extending in the plane of FIG. 8 and with a sliding pin 30 extending through and guided by the oblong hole. As can be seen in the drawing, the diameter of the sliding pin 30 is considerably less than the oblong dimension of the hole 29. A ring shoulder 31 is secured to the sliding pin so that the upper surfaces of the slide parts 17 bear against the shoulder. On the opposite or lower side of the slide parts, a disk is fitted onto the sliding pin and it is attached on a threaded extension 33 of the pin and is secured by a nut 34. The vertical spacing between the lower surface of the ring shoulder 31 and the upper surface of the disk 32 is adjusted so that the slide parts 17 can be displaceably guided between the shoulder and the disk. Extending transversely to the axis of the oblong hole 29 and outwardly from the surface or end of the hole more remote from the molding chamber 14 is a blind bore 35 in which a helical compression spring 36 is inserted so that it bears at one end on the bottom of the blind bore and at its other end against the lateral surface of the sliding pin. The helical compression spring 36 tends to displace the slide parts 17 in the direction of movement away from the core 19 as soon as the upper tool part 12 is displaced from contact with the lower tool part 13. The extent of the outward displacement of the slide part 17 is limited by the inner wall 37 of the oblong hole 29, that is the end of the hole closer to the core 19, when it contacts the sliding pin 30. This outwardly displacement of the slide parts 17 commences immediately with the relative movement separating the upper tool part 12 from the lower tool part 13 due to the beveled ends 38 of the slide parts 17 which are cut at an angle of 45° and the corresponding beveled surfaces of the lower tool part 13 which the slide parts contact when the apparatus is in the closed position such as indicated by FIG. 4. In FIG. 8 which also shows the closed position of the molding apparatus, the ends 38 bear on the correspondingly shaped surfaces of the lower tool part 13. As the parts of the apparatus are assembled into the closed position, the correspondingly beveled surfaces effect the closing of the injection molding chamber by displacing the end faces 20 of the slide parts 17 into contact with the juxtaposed surfaces of the web 18, note FIG. 4.

The above described displaceability of the slide parts 17 serves to effect the laterally outward displacement of the inner ends of the slide parts from the outer contours or surfaces of the molded section within the mold. The completed lateral displacement is shown in FIG. 5.

In addition to being laterally displaceable, the slide parts 17 are arranged for displacement parallel with the relative to the direction of movement of the upper tool part away from the lower tool part. To provide such displacement, the sliding pins 30 are guided within bores 39 in the upper tool part 12. At the upper ends of the sliding pins 30, stops 40 are arranged and a helical spring 41 wound around the sliding pin bears between the stop and the upper surface of the upper tool part 12. The compression springs 41 tend to press the slide parts 17 into contact with the juxtaposed surfaces of the upper tool part 12. The contact between the slide parts 17 and the juxtaposed surfaces of the upper tool part 12 is displaced against the resistance of the helical compression springs 41 when the stops 40 strike, during the opening displacement of the upper tool part 12 in which the sliding pins 30 initially participate, against stationary stops on the apparatus, not shown. After the stops 40 are prevented from further upward movement, only the upper tool part 12 continues to move for opening the molding apparatus while the sliding pins 30 and the slide parts 17 remain in position under the increasing stress of the helical compression springs 41. It can be seen that the core support member 16 lifts upwardly off the upper surfaces of the slide parts 17 in the manner shown in FIG. 6 and 7. After the injection molded section is removed from the apparatus, the apparatus is closed by reversing the movement of the upper tool part 12. At first, only the upper tool part moves downwardly until it strikes against the slide parts 17 and then the combination of the two continue in the closing movement of the apparatus. With continued closing movement, the slide parts which have been displaced outwardly due to the springs 36 start to move inwardly as their beveled ends 38 contact in sliding engagement the correspondingly beveled surfaces in the lower part 13 whereby the slide parts move inwardly toward one another in the direction of the core 19 until their end faces 20 contact the sides of the web 18.

The movements for the various parts of the molding apparatus described with reference to FIGS. 4 to 7, can be realized with other constructional means. It can be appreciated that the constructional means described with reference to FIG. 8 can also be provided in a multiple arrangement distributed over the axial extension of the injection molded section.

The method according to the invention permits not only the removal of the core from a duct section shaped as shown in FIG. 1, but it also affords the removal of duct sections where the flanges are not positioned at the lower ends of the side walls, but rather are located intermediate the upper and lower ends of the side walls.

Removal of the core from the molded section is also possible for duct sections which have no flanges at all. In such a duct section arrangement, ejector pins, acting in a known manner on the side walls, must be provided in the injection molding apparatus. Such ejector pins may also be necessary for the above described embodiment if the molded slide parts 17 do not overlap the flanges 4 when they are displaced laterally or do not provide sufficient restraining action at the bends because the radii of curvature of the guide tube are too small.

While a specific embodiment of the invention has been shown and described in detail to illustrate the application of the inventive principles, it will be understood that the invention may be embodied otherwise without departing from such principles.

What is claimed is:

1. In an injection molding operation for forming an undercut and continuously slotted elongated duct section with the slot extending in the elongated direction of the duct section and with lateral surfaces extending transversely outwardly from the part forming the slotted section from a thermoplastic material, with a duct section being at least in part curvilinear in the elongated direction, where the mold includes a unitary core for forming the undercut interior of the duct section with a web section secured to and extending outwardly from the core for forming the slotted part of the duct section, the web section having a dimension extending in the same direction as and being smaller than the maximum transverse dimension of the core, side parts for forming the lateral exterior of the duct section with the side parts in contact with the web section but not in contact with the cove in the assembled position of the mold for forming the laterally outer surfaces of the slotted duct section and combining with the web section in the formation of the slotted part whereby in the assembled position for forming the molded duct section and side parts extend inwardly of the maximum transverse dimension of the core into contact with the web section, and a base section positionable opposite and below the core for forming the lower portion of the duct section and of the lateral surfaces extending transversely outwardly from the part forming the slotted duct, the method of removing the core comprising the steps of cooling the injection molded duct section to a temperature below the softening temperature of the thermoplastic material used at which the thermoplastic material is resilient and is capable, following deformation, of returning to its original molded shape, and while the plastic material is resilient and capable of returning to its original molded shape, withdrawing the side parts forming the lateral exterior surface of the duct section and also from contact with the lateral surface of the web section so that the side parts move transversely relative to the elongated direction of the duct section, separating the base section of the mold from contact with the lower portion of the molded section while retaining the core within the interior of the duct section, maintaining the outwardly displaced lateral side parts of the mold in contact with the lateral surfaces of the injection molded duct section outwardly from the part forming the slotted portion above the location of contact of its lower portion with the base section of the mold for restraining the molded duct section from movement in the direction upwardly from its continuous slot, and, while restraining the lateral surfaces extending transversely outwardly from the part forming the slotted duct from movement in the upward direction from the continuous slot, effecting a relative movement transverse of the elongated direction of the continuous slot in the duct section between the core and the restrained injection molded duct section for removing the core from the undercut duct section upwardly through the continuous slot.

2. In an injection molding operation, as set forth in claim 1, characterized therein by holding the injection molded duct section stationary during the relative movement between it and the core, and pulling the core upwardly through the continuous slot formed in the duct section.

* * * * *